United States Patent [19]

Garner et al.

[11] 4,266,625
[45] May 12, 1981

[54] TRACTION VEHICLE

[75] Inventors: Fay T. Garner; Jerauld D. Joubert, both of Longmont, Colo.

[73] Assignee: Melroe Multi-Wheel, Longmont, Colo.

[21] Appl. No.: 869,697

[22] Filed: Jan. 16, 1978

[51] Int. Cl.² .................. B62D 11/04; E02F 3/76
[52] U.S. Cl. .................. 180/6.48; 180/24.08; 296/190; 172/292; 172/272
[58] Field of Search ............. 296/102, 28 C, 146; 180/24.08, 24.06, 6.48; 172/272, 292

[56] References Cited

U.S. PATENT DOCUMENTS

| | | | |
|---|---|---|---|
| 2,490,904 | 12/1949 | Gustafson | 172/611 |
| 3,061,376 | 10/1962 | Barenyi | 296/146 |
| 3,168,927 | 2/1965 | Garner | 180/24.06 |
| 3,198,551 | 8/1965 | Garner | 180/24.08 |
| 3,204,713 | 9/1965 | Shanahan | 180/24.08 |
| 3,367,436 | 2/1968 | Fox | 180/24.08 |
| 3,690,395 | 9/1972 | Spiller | 172/272 |
| 4,070,052 | 1/1978 | Ng | 293/71 R |

FOREIGN PATENT DOCUMENTS 2334554  7/1977  France .................. 296/28 C

Primary Examiner—Richard J. Johnson
Attorney, Agent, or Firm—Gary M. Polumbus

[57] ABSTRACT

A traction vehicle includes a frame module formed principally from a plurality of platelike structural elements permanently fixed together to provide substantial rigidity for supplying and withstanding relatively large forces. Elongated boxlike drive assembly housings define the outer transverse longitudinal edges of the frame module, and a plurality of vertically-spaced, transversely-extending plate members connect the laterally positioned drive assembly housings in the frame module. End members extend transversely of the longitudinal ends of the frame module for applying the high forces from the vehicle. A plurality of driving wheel members are positioned outwardly from the drive assembly housings, and one separate power train assembly supplies reversible motive traction power simultaneously to all the driving wheel members on each lateral side of the vehicle. An operator's cab is positioned above the frame module, the sidewalls of the cab slope outwardly and define an octagonal cab structure. An implement socket defining a rectangular socketlike structure receives the end of the frame module to operatively attach an implement, such as an earthmoving blade assembly, to the frame module. The implement is attached to the implement socket by apparatus which maintains a selected angle of application or cutting angle of the implement to the earth material with changes in relative elevation of the frame module end and the bladelike implement during use. The attaching apparatus further allows for selective adjustment of the cutting angle, and selective rotation of the attaching apparatus and implement with respect to a horizontal and longitudinal axis through the vehicle.

7 Claims, 16 Drawing Figures

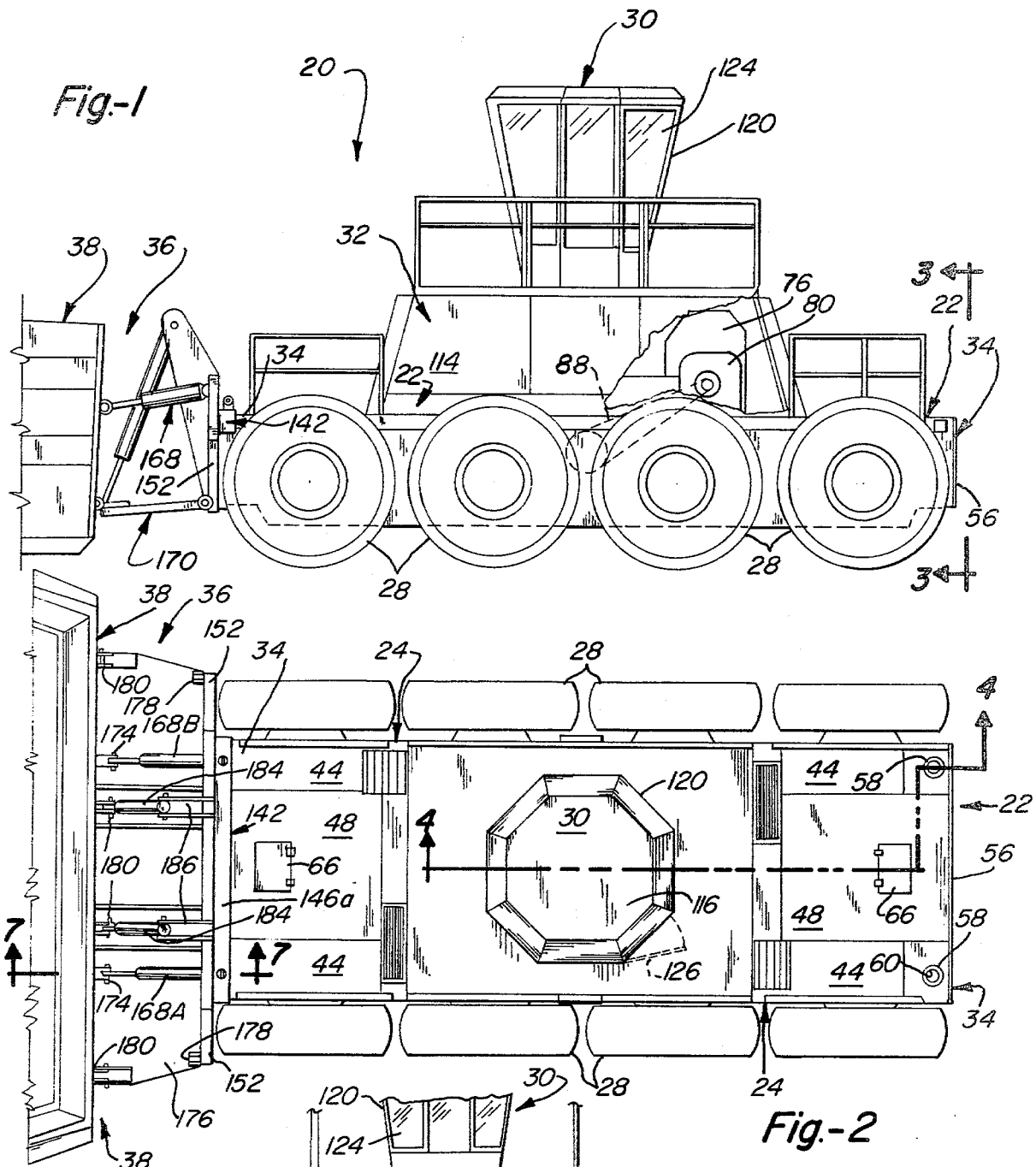
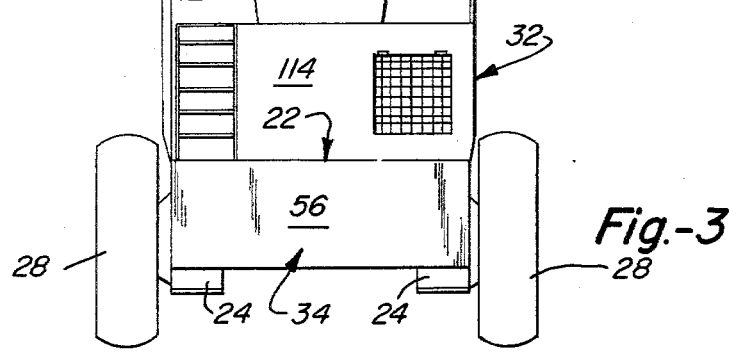

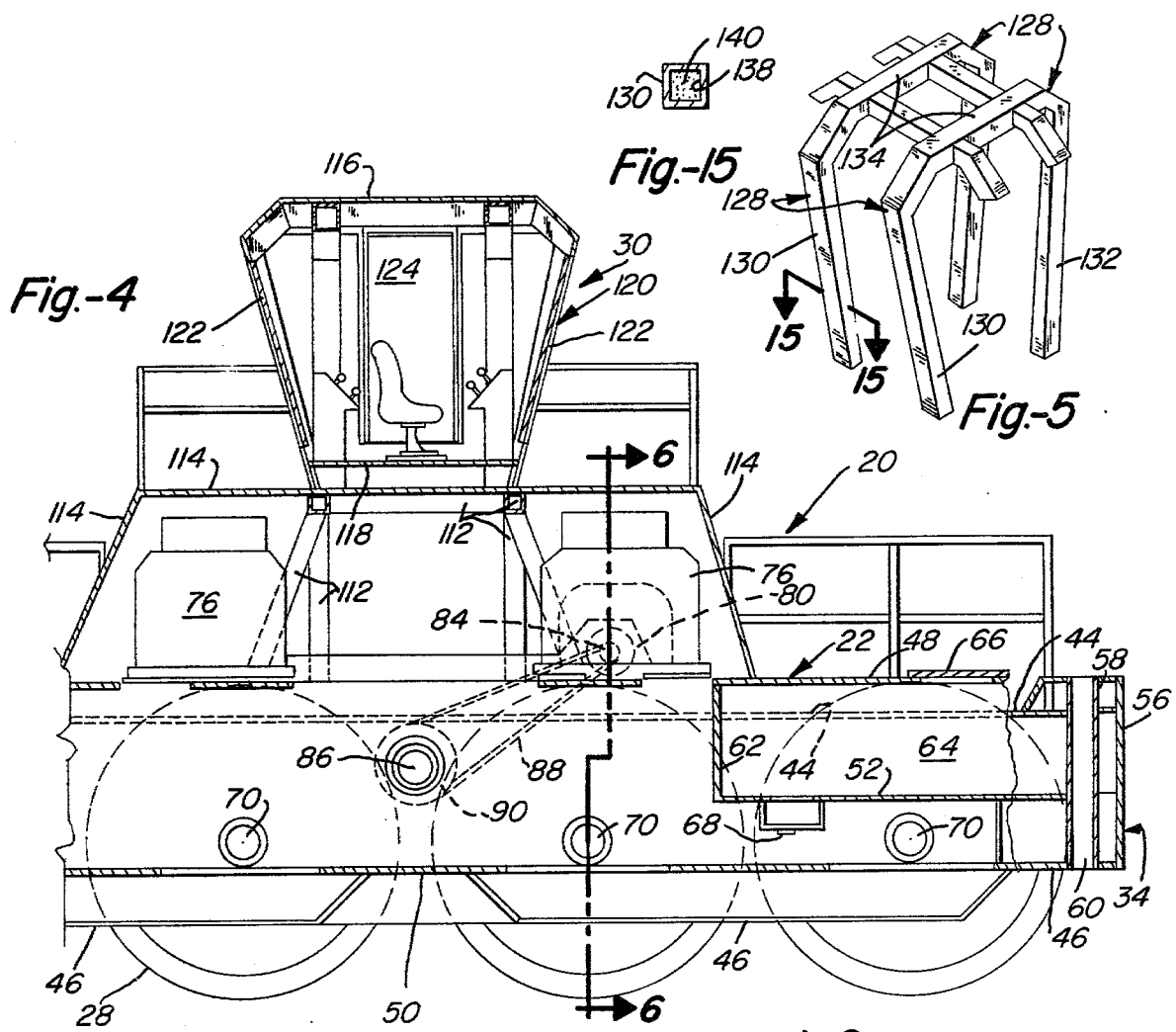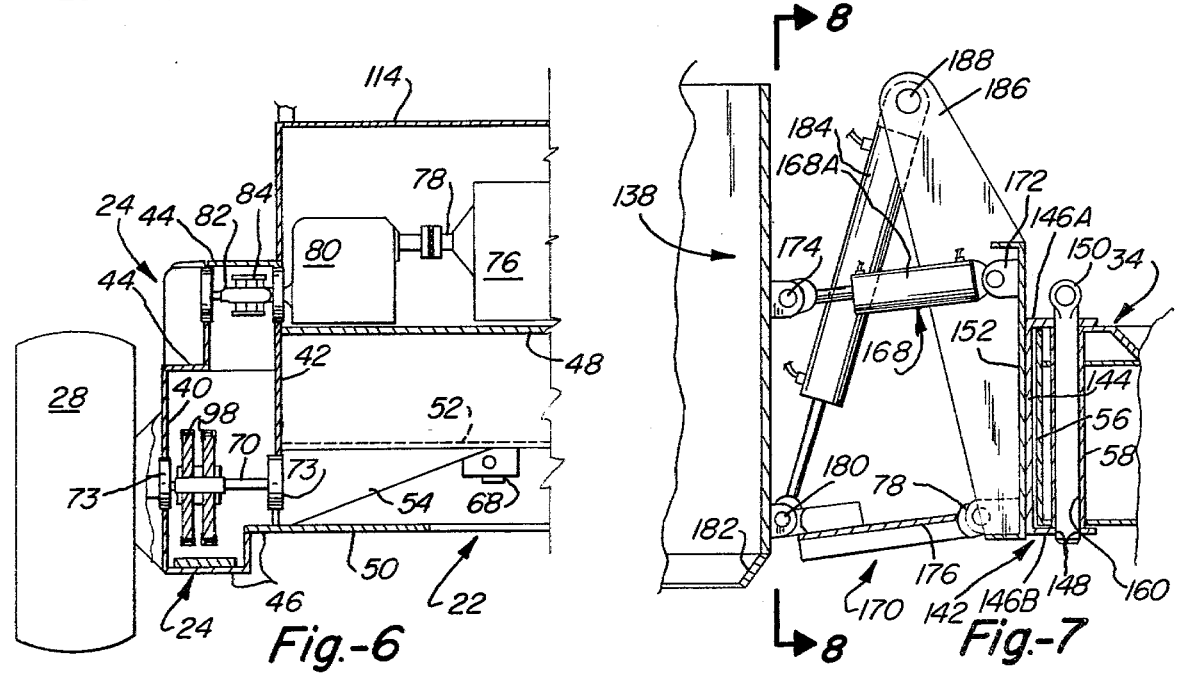

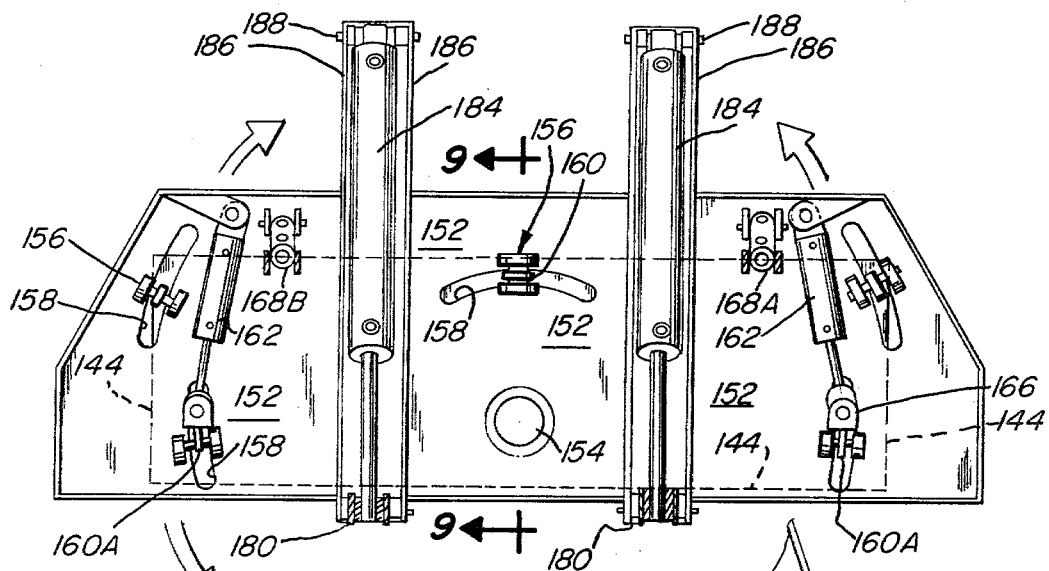
Fig.-8
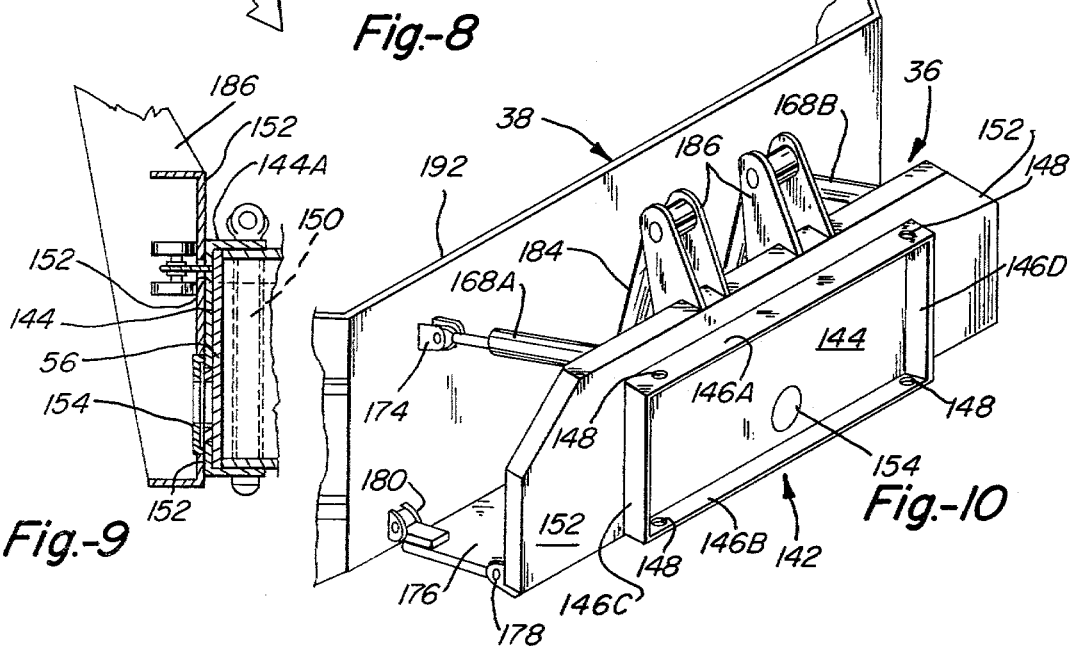
Fig.-9
Fig.-10
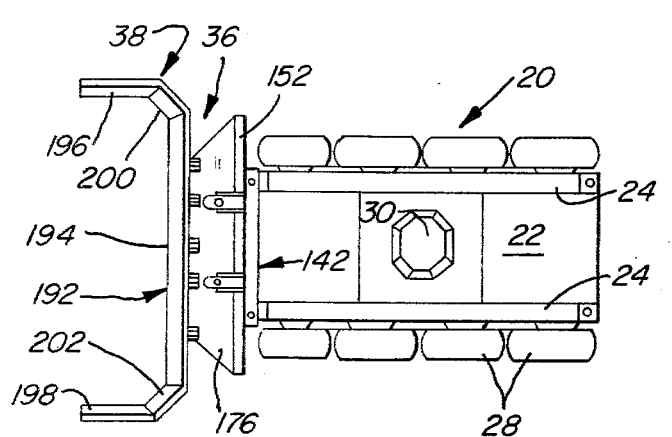
Fig.-11
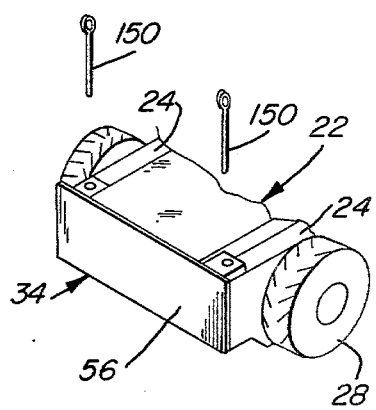
Fig.-12

TRACTION VEHICLE

FIELD OF THE INVENTION

This invention relates to motive vehicles of the high powered traction type typically used in heavy construction, such as for pushing large earthmoving equipment or serving as the carrier or main motive vehicle for an earthmoving implement such as a bulldozer blade of the like.

BACKGROUND AND BRIEF DESCRIPTION OF THE PRIOR ART

Traction vehicles utilizing a rectangular or boxlike frame for positioning and supporting the motive power elements of the vehicle are known in the art. One example of the prior art is a traction vehicle disclosed in U.S. Pat. No. 3,168,927 to F. T. Garner, issued Feb. 9, 1965. The frame is such traction vehicles is generally utilized to apply the relatively high force from operation of the vehicle. This applied force can be relatively great since the vehicle is of unusually high power, and it is therefore important that the frame provide sufficient rigidity and structural strength to apply this relatively high force. The power train assembly, which supplies the relatively high traction motive forces to the driving wheels of the vehicle, must also withstand very high torque and forces, and it is important that the elements comprising the power train assembly secure relatively high torque and load handling capabilities for over reasonably long periods of continued use.

It is important to be able to connect a selected type of implement, typically an earthmoving blade, to the traction vehicle for best effective utilization in a construction task. Since the apparatus for attaching the implement transmits the force from the frame to the implement, it is important that the attaching apparatus be arranged to effectively couple force from the frame of the vehicle. Once properly attached to the frame of the vehicle, it is also desirable that the implement be connected in a manner which allows its most effective utilization.

Other features which are desirable for use with traction vehicles, and certain disadvantages of prior art traction vehicles may be known in the art. However, in general and as a result of the present invention, many of the previous disadvantages can be avoided or overcome and many of the advantages previously unobtainable can be achieved.

OBJECTS AND SUMMARY OF THE INVENTION

It is the general objective of the present invention to provide a new and improved traction vehicle of the type wherein a plurality of driving wheels on each transverse side of the vehicle are separately interconnected for simultaneous application of motive power for moving the vehicle. Other objectives of the invention are to more effectively utilize the structural elements in a modular frame assembly for the purpose of increasing the structural rigidity of the frame member and thereby increasing the amount of power which may be applied and handled by the frame. Another objective is to provide a modular frame member which can be effectively and more easily constructed to provide increased structural rigidity.

Another general objective is to provide a new and improved power train assembly wherein the motive power elements are arranged to increase the usable lifetime, to equally distribute the load throughout the elements of the power train assembly and to increase the load handling capability of the power train assembly over extended periods of use.

Further objectives of the invention are to provide a new and improved implement connecting socket by which a desired type of implement can be effectively connected to the frame member of the traction vehicle. Another objective is to effectively couple forces from an attached implement to the frame and to apply the forces over a relatively large area of the frame and thereby significantly reduce potential for damaging the frame, attaching apparatus, or the implement. Another objective is to provide an attaching apparatus for use with a high power traction vehicle which can be easily connected and disconnected to the frame of the vehicle. Still another objective is to provide a new and improved apparatus for connecting an implement to the traction vehicle whereby the implement can be more effectively utilized.

Other objectives in providing the new and improved implement attaching apparatus are to maintain and adjust the selected angle of application or pitch of the implement to the material to which the implement is applied, and to adjust or rotate the implement about a longitudinal axis to obtain its best selected condition for use.

In accordance with these objectives and the invention's general aspects, the traction vehicle generally comprises a modular frame assembly and two separate power train assemblies positioned on the frame for supplying reversible motive traction power for moving the vehicle. The modular frame assembly comprises a pair of elongated drive assembly housings, the drive assembly housings being formed as an integral part of the modular frame assembly along each transverse side of the frame module. Transversely extending plate members connect the drive assembly housings, and end members extend substantially transversely of the frame modular at the longitudinal ends thereof. One of the two separate power train assemblies is operatively associated with each drive assembly housing. Each power train assembly generally comprises at least two driving wheels, each of which has an axle shaft connected thereto which extends transversely into the drive assembly housing. The drive wheels are positioned laterally outwardly with respect to each drive assembly housing. Means such as chain and sprocket assemblies interconnect all of the axle shafts within one drive assembly housing and a power supply means supplies motive power simultaneously to all of the interconnected axle shafts. The drive assembly housings each comprise outer and inner upwardly extending housing plate members, and the rotating shafts of each power train assembly extend between the inner and outer housing plate members. A power delivery shaft of the power train assembly supplies power through the chain and sprocket assemblies to groups of interconnected axles. At least two of the groups of interconnected axle shafts supply approximately the same amount of motive traction force, thereby distributing portions of the motive power from the delivery shaft equally to the two groups. A sprocket arrangement on the power delivery shaft is arranged to reduce bearing loading by reducing the moment on the power delivery shaft from chain pull forces. The transverse plate members connecting the drive assembly housing cooperatively provide structural containers and compartments within the modular frame structure.

An operator's cab is operatively positioned above the frame structure and includes sloping sidewalls. A pair of main support bars extend transversely about the transverse profile of the operator's cab.

Attachment apparatus operatively attaches and positions an implement, such as an earthmoving bladelike implement, longitudinally forward of one end of the traction vehicle. Linkage means of the attachment apparatus maintains a selected angle of application of the implement to the earth material with changes in elevation of the implement relative to the end of the vehicle. A parallel linkage assembly preferably maintains the selected angle of application. The angle of application is adjusted preferably by means for changing the effective length of one or the other of the parallel linkage assemblies. The attachment apparatus rotates the implement with respect to a horizontal and longitudinal axis through the vehicle. Preferably an implement attaching socket defining a socketlike receptacle for receiving the rectangular end of the frame module is provided. A base wall member of the attachment apparatus contacts the end of the frame module and a supporting wall member is rotably connected to contact the base wall member. The linkage assembly operatively connects the implement to the supporting wall member in the operatively described manner. One type of advantageous earthmoving equipment includes blade structure defining a U-shaped or bowllike earth contacting device.

A more complete understanding of the invention can be obtained from the appended claims, and from the description of a presently preferred embodiment of the invention taken in conjunction with a drawing consisting of a number of figures.

BRIEF DESCRIPTION OF THE DRAWINGS

FIG. 1 is a side elevational view of a traction vehicle, an earthmoving bladelike implement, and apparatus for attaching the implement in a longitudinally spaced position from one end of the vehicle. A portion of the traction vehicle is broken out for clarity of illustration.

FIG. 2 is a top plan view of FIG. 1.

FIG. 3 is an end elevational view taken substantially in the plane of line 3—3 of FIG. 1.

FIG. 4 is a partial vertical section view of the traction vehicle taken substantially in the plane of line 4—4 of FIG. 2.

FIG. 5 is a perspective view illustrating two main support bar control elements of an operator's cab of the traction vehicle.

FIG. 6 is a partial vertical section view taken substantially in the plane of line 6—6 of FIG. 4.

FIG. 7 is an enlarged partial vertical section view of the apparatus for attaching the bladelike implement to a portion of the traction vehicle, a portion of one longitudinal end of the traction vehicle, and a portion of the earthmoving bladelike implement.

FIG. 8 is a vertical end elevational view of the attaching apparatus viewed substantially in the plane of line 8—8 of FIG. 7.

FIG. 9 is a vertical section view taken substantially in the plane of line 9—9 of FIG. 8.

FIG. 10 is a perspective view of the apparatus for attaching the earthmoving implement to the end of the traction vehicle, a portion of an earthmoving implement and structure defining a socketlike receptacle for receiving the end of the traction vehicle.

FIG. 11 is a reduced and generalized top plan view of the traction vehicle, the attaching apparatus for an implement, and an earthmoving bladelike implement having a U-shaped earth contacting configuration opening longitudinally forward of the traction vehicle.

FIG. 12 is a reduced and generalized partial perspective view of an end of the traction vehicle schematically illustrating an arrangement for connection of the implement socket to the end of the vehicle.

FIG. 15 is a section view taken substantially in the plane of line 15—15 of FIG. 5.

DESCRIPTION OF PREFERRED EMBODIMENT

Figure 14:
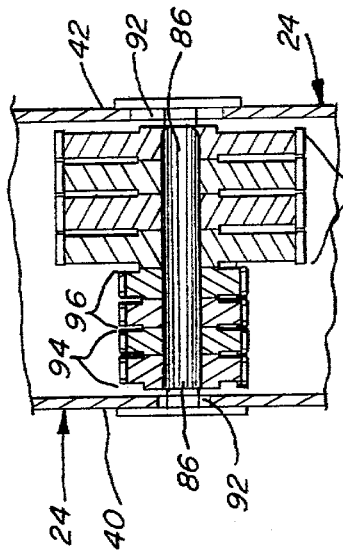
FIG. 14 is a vertical section view taken substantially in the plane of line 14—14 of FIG. 13, illustrating the elements in assembled relation.

A traction vehicle 20 embodying concepts of the present invention is generally illustrated in FIG. 1 The traction vehicle 20 includes a modular frame structure comprising various structural elements permanently and rigidly fixed to one another to define a structurally rigid frame module 22 for the vehicle. On each transverse side of the longitudinally extending frame module 22, one drive assembly housing 24 (FIGS. 6 and 16) is integrally formed as a part of the frame module 22 and defines the outer transverse edges of the frame module. One separate power train assembly 26 (FIG. 13) is operatively associated with each lateral side of the vehicle 20. The power train assembly includes a plurality of driving wheel members 28 positioned on opposite lateral sides of the vehicle 20 and which rotate in planes parallel to the longitudinal axis of the vehicle. The driving wheel members 28 are operatively connected for rotation by the power train assemblies, and all of the driving wheels on one lateral side of the vehicle are connected for simultaneous rotation. Separate power train assemblies are provided for each lateral side of the vehicle, and each power train assembly is separately controllable for maneuvering the vehicle. Furthermore, each power train assembly provides reversible motive traction power to the driving wheels.

An operator's cab 30 is positioned above the frame module 22. The operator controls the operation of the vehicle 20 from the cab 30. A tower structure 32 positions the operator's cab 30 a sufficient height above the frame module 22 to allow the operator good visibility for operating the vehicle.

The motive traction power from the vehicle 20 is applied through the modular frame structure 22, by attaching an appropriate implement to either one or both longitudinal ends 34 of the modular frame 22. Apparatus 36 operatively attaches an implement 38 such as a bladelike earthmoving implement, to the frame module 22. The particular form of the connecting apparatus 36, described in greater detail subsequently, provides for best effective use of the implement 38 by allowing selective manipulation and positioning of the implement in a variety of different advantageous positions.

Figure 16:
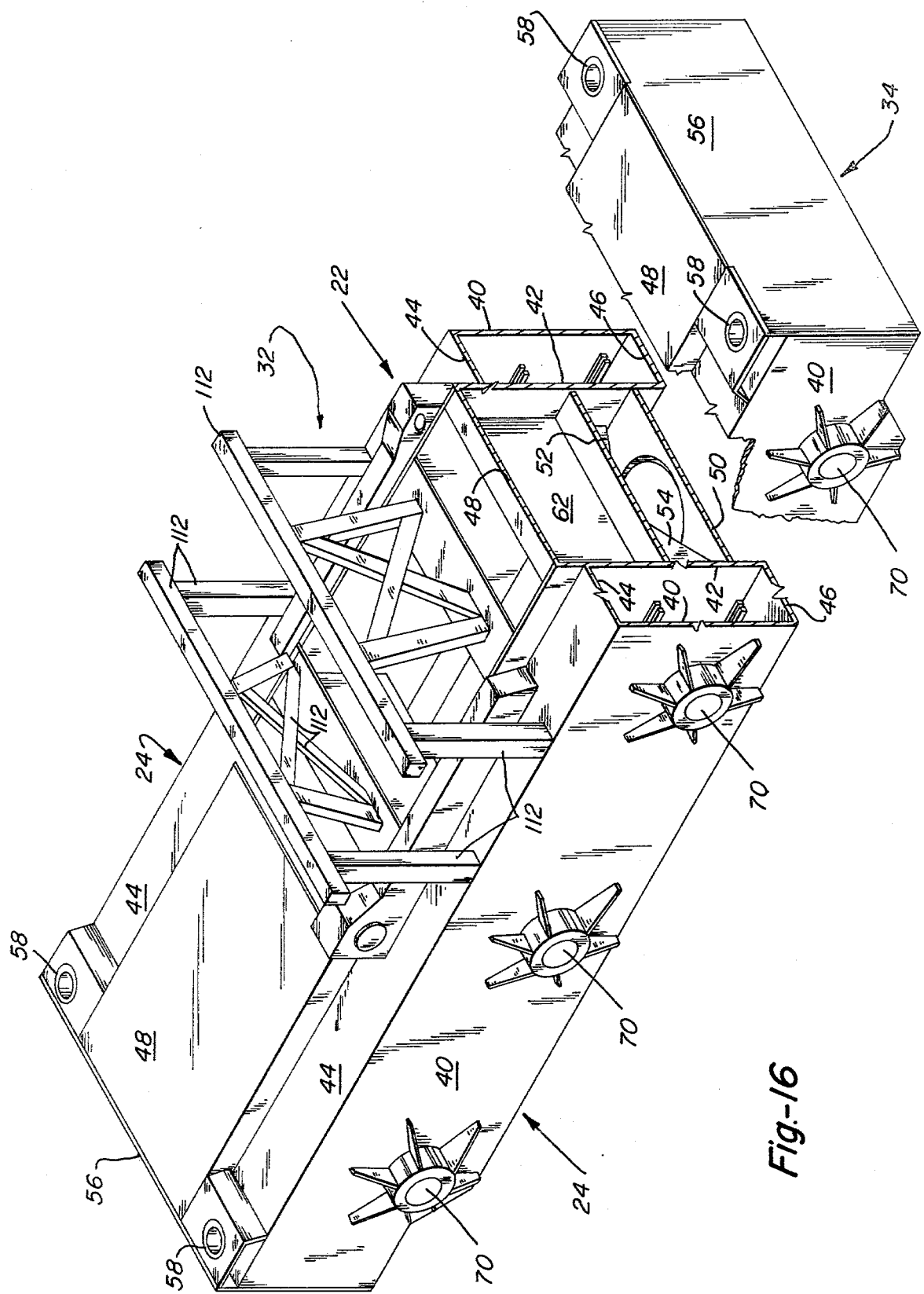
FIG. 16 is a generalized perspective view of a frame module utilized in the traction vehicle shown, with many elements removed for clarity of illustration.

Details of the modular frame structure 22 may be more fully appreciated by reference specifically to FIGS. 4, 6 and 16, and by general reference to FIGS. 1, 2, and 3. The structural elements of the modular frame 22 may preferably be formed of structural sheet steel which has been permanently fixed together such as by welding. The pair of transversely spaced apart drive assembly housings 24 define the opposite laterally extending transverse sides of the modular frame 22. Each of the drive assembly housings 24 is similar in construction, and therefore only one will be described in detail.

Each drive assembly housing is of elongated boxlike construction. Each housing 24 includes an outer upwardly extending housing plate member 40 and a transversely spaced inner upwardly extending housing plate member 42. The inner and outer upward extending housing plate members are preferably formed of single pieces of planar material. The housing 24 aslo includes an upper housing plate member 44 and a vertically spaced lower housing plate member 46. The upper and lower housing plate members may be formed of a plurality of individual segments of flat material appropriately fixed together to generally define the upper and lower segments of the boxlike construction of the housing 24. Within each drive assembly housing 24, elements of the power train assembly 26 are positioned for rotating the drive wheel members 28 spaced outwardly from the drive assembly housing.

The modular frame 22 is further defined by at least one upper frame plate member 48 transversely connected between the pair of transversely spaced drive assembly housings 24. The upper frame plate member 48 is connected to the drive assembly housings 24 at an upper position on the housings 24 (FIG. 6). At least one lower frame plate member 50 is transversely connected between the housings 24 at positions on the housing lower than the upper frame plate member 48. In addition, an intermediate frame plate member 52 may be transversely connected between the pair of transversely spaced housings 24 at the positions on the housings substantially intermediate the upper frame plate member 48 and the lower frame plate member 50. Appropriate reinforcing members in the form of gussets 54 (FIG. 6) are connected between the drive assembly housing 24 and at least one of the frame plate members 48, 50 or 52. The gussets 54 extend substantially transversely of the frame module 22 and substantially increase the structural rigidity of the frame structure.

An end frame member 56 (FIG. 4) is connected at each longitudinal end 34 of the vehicle. The end frame member 56 extends substantially transversely of the frame module 22 and is connected to the outer housing plate member 40 of the pair of transversely spaced drive assembly housings 24. The frame end member 56 is also connected to at least one of the frame plate members 48, 50, and 52, preferably both the upper and lower frame plate members 48 and 50.

A pin tube member 58 having a hollow interior 60 is upwardly positioned adjacent the longitudinal end of the vehicle in each drive assembly housing 24. The pin tube member 58 extends between and through the upper and lower housing plate member 44 and 46 respectively. As will become more apparent from the subsequent description, the pin tube member 58 is utilized in attaching apparatus to the longitudinal end 34 of the modular frame 22.

The frame module 22 is advantageously arranged to define containers intermediate the drive assembly housings 24 for receiving selected material therein. A plurality of container wall members 62 (FIG. 6) extend generally upwardly from the intermediate frame plate member 52 to the upper frame plate member 48. The containers defined by the top and intermediate frame plate members and the container wall members may be utilized for containing fuel oil for the engines associated with the power train assemblies 26 or for containing ballast, for example. Shown in FIG. 6, the members 48, 52, and 62 define a ballast container or tank 64 located at the longitudinal end 34 of the frame module. An upper door 66 is formed in the upper frame plate member 48 for upper access to the ballast tank 64. A lower door 68 is formed in the intermediate frame plate member 52 for removing material contained within the tank 64. Ballast tanks 64 at each longitudinal end of the frame member are useful in loading or balancing the vehicle 20 according to its manner of use.

By connecting the structural elements of the frame structure 22 permanently in the manner described, a modular frame structure of very high rigidity and force applying characteristics is obtained. The structural elements of the modular frame are effectively utilized to increase the structural rigidity of the frame member without adding unnecessary weight. By forming the frame in a one piece modular structure, the manufacturing and assembly of the frame is considerably simplified. Furthermore, by arranging the structural elements of the modular frame in the manner described, certain functional features such as interior containers and tanks may be obtained while not increasing the number of elements necessary to secure the desired structural rigidity.

Figure 13:
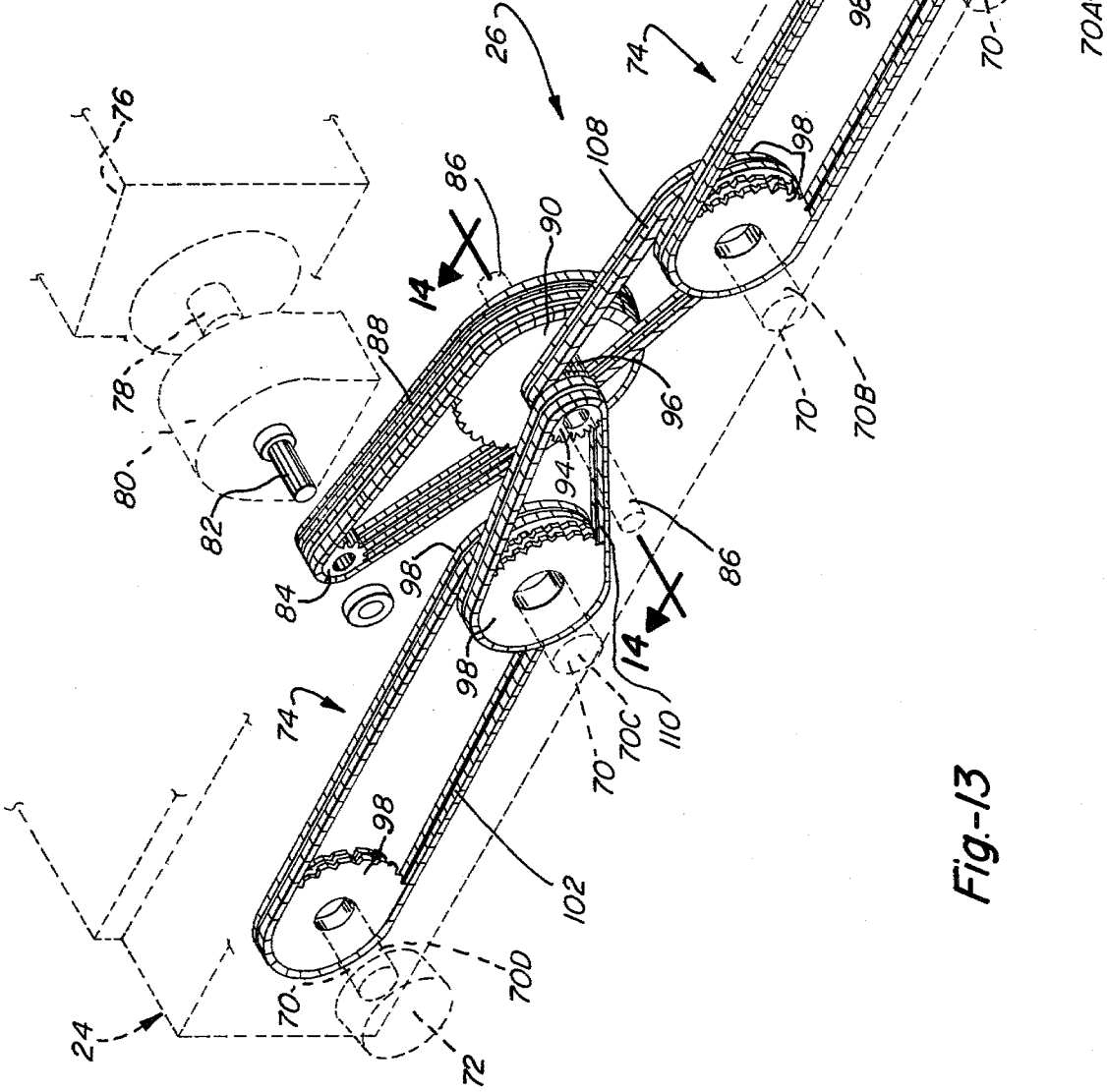
FIG. 13 is an enlarged perspective view of one power train assembly for simultaneously supplying motive rotating traction force to the drive wheel members on one transverse side of said traction vehicle, the elements of the power train assembly being illustrated in exploded relation and a portion of an associated drive assembly housing being shown in phantom.

Details of the power train assemblies 26 operatively associated with each drive housing assembly 24 can be understood by specific reference to FIG. 13 and FIG. 6, and by general reference to FIGS. 1 and 4. Two separate power train assemblies 26 are provided in the vehicle 20. One of these power train assemblies 26 is operatively connected with the drive wheel members 28 positioned on one tranverse side of the vehicle 20, and the other power train assembly is associated with the drive wheel members on the opposite transverse side of the vehicle. Each of the two power train assemblies is similar and each is separately controllable to simultaneously supply all of the drive wheel members 28 on one lateral side of the vehicle with reversible motive traction power. Each drive assembly housing 24 operatively positions and retains the majority of elements of each power train assembly 76. A supply of lubrication for the elements of the power train assembly is contained within each drive assembly housing.

In each power train assembly 26, one axle shaft member 70 is operatively connected to each driving wheel member 28, such as through a conventional planetary wheel end assembly 72. Rotation of the axle shaft 70 operatively rotates the connected driving wheel member 28 and transmits motive traction power for moving the vehicle. Each of the axle shafts 70 is retained by conventional bearing means 73 in the inner and outer housing wall members 40 and 42 respectively of the drive assembly housings (FIG. 6). The axle shafts 70 are therefore transversely mounted through the drive assembly housings 24 for rotation.

To interconnect all of the axle shafts 70 within one drive assembly housing 24 for the purpose of simultaneously transmitting rotating power to all of the axle shafts, conventional chain and sprocket drive means, generally referenced 74, are provided. A supply of motive power for moving the sprocket and chain means 74 is supplied by an internal combustion engine 76, such as a conventional diesel engine. The power output from the engine 76 is coupled through an output shaft 78 to a conventional torque converter and transmission device 80. A power input shaft 82 for the power train assembly 26 extends from the torque converter and transmission device 80 into the housing 24. The shaft 82 is retained by the inner and outer housing wall members 40 and 42 for rotation. A sprocket 84 couples power from the input shaft 82 to a power delivery shaft 86 by means of a chain 88 and sprocket 90.

As is best seen in FIG. 4, the power delivery shaft 86 is retained for rotation transversely within the drive assembly housing 24 by bearings 92 positioned in the inner and outer housing plate members 40 and 42 respectively. Sprocket 90 is preferably positioned next adjacent the end of the power delivery shaft 86 adjacent the inner housing plate member 42. Two similarly sized sprockets 94 and 96 are fixed on the shaft 86 next adjacent one another, with the sprocket 96 adjacent the sprocket 90. Power is transmitted from the power delivery shaft 86 through the sprockets 94 and 96 to the axle shafts 70. Each of the axle shafts has fixed thereon at least one sprocket 98. Each of the sprockets 98 is of similar size. A chain 100 connects sprockets 98 on the adjacent pair of axle shafts 70A and 70B thereby causing axle shafts 70A and 70B to rotate simultaneously. Similarly, a chain 102 connects sprockets 98 on the adjacent pair of axle shafts 70C and 70D for simultaneous rotation. A chain 108 links sprocket 96 to the sprocket 98 on shaft 70B adjacent the power delivery shaft 86, and thereby delivers motive power from the power delivery shaft 86 to the pair of interconnected axle shafts 70A and 70B. Similarly, a chain 110 operates to supply power from the sprocket 94 on the power delivery shaft 86 to the sprocket 98 connected to axle shaft 70C. In this manner the pair of axle shafts 70C and 70D are supplied with motive power.

Each of the axle shafts 70 preferably is positioned within the drive assembly housing 24 with the axis of rotation of each of the axle shafts lying within a horizontal plane. This arrangement is more clearly illustrated in FIG. 4. Preferably, the power delivery shaft 86 is positioned in the drive assembly housing 24 at a position in which approximately the same number of axle shafts 70 are in longitudinal front of the shaft 86 as the number of axle shafts 70 in longitudinal rear of the shaft 86. Thus, the shaft 86 is preferably positioned approximately in the longitudinal middle of the drive assembly housing. Arranged in this manner, the power delivery shaft 86 transmits approximately the same amount of motive power in opposite longitudinal directions in front of and behind the shaft 86. This has the effect of equalizing the loading on the chains 108 and 110 thereby avoiding a situation where one or more of the chains or sprockets associated with the power delivery shaft 86 are required to withstand a greater than necessary amount of force when supplying motive traction power. Similarly, the potential for supplying substantially all of the input motive power over one chain and sprocket connecting means to one axle assembly is reduced, because approximately equal numbers or groups of drive axle assemblies are connected to the power delivery shaft. Equalizing the distribution of input motive power promotes an increased lifetime of the elements of the power train assembly and thereby reduces the potential that the vehicle would be rendered inoperable due to failure of one or more of the power train assembly elements, after relatively short periods of use.

The arrangement of the sprockets 90, 94, 96 on the power delivery shaft 86, as shown in FIG. 14, also secures important advantages. The bearing means 92, which retains the ends of the power delivery shaft 86 in the housing wall members 40 and 42, is required to withstand reduced amounts of lateral force resulting from the chain pull force from chains 88, 108, and 110. The amount of this lateral restraining force is related to the moment created on the shaft 86 as a result of the chain pull force. By positioning the sprockets 94 and 96 next adjacent one another on the shaft 86, less moment or lateral restraining force is created, because the opposite forces delivered from sprockets 94 and 96 more nearly tend to cancel the moments created by those forces. Similarly, by positioning the sprocket 90 adjacent the other end of the shaft 86 the moment created by the pull force from chain 88 is reduced. As a result the lifetime of the bearing means 92 is increased and the forces on the power delivery shaft 86 are reduced. This arrangement is to be compared to the prior art arrangement wherein the sprocket 90 is positioned intermediate sprockets 94 and 96. In this prior art arrangement the moments and forces on the shaft 86 are considerably increased over the present inventive arrangement.

Details of the operator's cab 30 and the tower structure generally illustrated at 32 for positioning the cab above the frame module 22 may be better understood by specific reference to FIGS. 4, 5, and 15 and by general reference to FIGS. 1, 2, and 3. The tower structure 32 includes a plurality of structural beam members 112 securely attached to the upper surface of the modular frame 22. The beam members 112 define a supporting structure for the operator's cab 30. In addition, a housing 114 is attached to the tower beams 112 and contains therein the engine 76, torque converter and transmission device 80, and other associated elements of the power train assembly.

The operator's cab is securely fixed atop the tower beam structure 112. The cab 30 includes top, bottom, and sidewall structure, respectively illustrated at 116, 118, and 120. The sidewall structure 120 is defined by a plurality of sidewall panels 122 operatively connected together. Preferably eight sidewall panels are provided and connected to define an octagonal shape for the cab in horizontal cross-section (FIG. 2). The upper portion of each of the sidewall panels 122 is preferably provided with a window 124 through which the operator may look. A door 126 (FIG. 2) provides access to the interior of the cab 30.

Each of the sidewall panels 122 angles outwardly of the cab at an upper position, with respect to a vertical reference from the bottom portion of the sidewall panel. By angling the sidewall panels in this manner, the noise within the interior of the cab 30 is dispersed and reduced, since the noise does not readily continue to reflect back and forth against the sidewall panels, as the noise would if the opposite sidewall panels were essentially parallel. Furthermore, the glare on the windows 124 is reduced since the operator's line of sight is more nearly perpendicular to the plane of the window when viewing the operation of the vehicle. The octagonal shape of the cab allows relatively unimpeded lines of sight in all directions from the cab.

A pair of main support bars 128 or supporting structural elements extend essentially parallel to one another and transversely within the cab 30. The main support bars 128 position the sidewall and top structure of the cab, and provide protection for the operator if the vehicle should roll over. Each main support bar 128 comprises a first segment 130 extending upward from the cab bottom structure 118 along the outward sloping sidewall panel 122, and a second segment 132 similarly positioned on the transverse opposite side of the cab. A third segment 134 extends generally transversely between the upper points of the first and second segments adjacent the top structure 116 of the cab. Each of the three segments of each support bar 128 includes a generally hollow interior 138 which has been completely filled with compacted granular solid material, such as sand 140, as is shown in FIG. 15. The sand prevents the support bars 128 from crimping or kinking, if a high transverse force is applied to the operator's cab, such as would occur in a vehicle rollover. The sand thereby interiorly reinforces the support bars 128 for an added measure of safety for the operator.

As should be apparent, all controls over the operation of the power train assemblies are located within the cab 30. As a result, the operator can effectively maneuver the traction vehicle 20 by separately controlling each of the two separate power train assemblies.

Details of the apparatus 36 for connecting the implement 38 to the longitudinal end 34 of the frame module 22 can be understood by specific reference to FIGS. 7, 8, 9, and 10 and by general reference to FIGS. 1, 2, and 11. The attaching apparatus 36 generally comprises an implement socket 142 which is adapted for connection to the longitudinal end 34 of the frame module, and linkage means and arm members generally adapted for operatively connecting the implement 38 in a longitudinally spaced position with respect to the end of the frame module.

The implement socket 142 is defined by a generally flat upward extending base wall member 144 having a generally rectangular shape. A plurality of lip members, collectively referenced 146, are attached rigidly to the base plate member 144 and extend perpendicularly away therefrom. The lip members include upper and lower transversely extending lip members 146A and 146B, respectively, and two vertically extending side lip members 146C and 146D, respectively. The lip members 146 and the base plate member define a generally rectangular shaped socketlike receptacle for receiving the generally rectangular longitudinal end of the frame module. Formed near the transverse ends of the upper and lower lip members 146A and 146B, are apertures 148. The apertures 148 are positioned in generally aligned position over the hollow interior 60 of the pin tube member 58 (FIG. 4) when the implement socket 142 is received over the end 34 of the frame module 22. Accordingly, the lip members 146A and 146B extend over the frame module a sufficient amount to position the apertures 148 in this manner (FIG. 4). To connect the implement socket 142 to the end of the frame module, a pair of pin members 150 are inserted through the apertures 148 and through the hollow interior 60 of the pin tube 58. Use of the pin members 150 as the retaining means allows the implement socket to be quickly attached or detached from the vehicle.

The implement socket 142 thus described allows relatively high magnitudes of forces to be transferred to and from the vehicle frame 22. The lip members 146 extend over the ends 34 of the frame module 22 to retain the implement socket 142 against rotation about the end of the frame module. The frame end member 56 presents a relatively large area for application of force from the vehicle, and the base plate member 144 presents a similar area for receiving this force. The size of the apertures 148 is such that when force is applied, the frame end plate 56 contacts the base plate member 144 and the apertures 148 do not apply force to the pin members 150. Thus the substantial force from the vehicle is distributed over a relatively large area to avoid points of concentrated force. This reduces the potential for damaging the structure of the frame module 22 or the implement socket 142. Thus, it can be understood that the pin members 150 serve primarily to hold the implement socket on the end of the frame, and do not supply or absorb any significant part of the force supplied from the vehicle when pushing the implement.

A supporting wall member 152 is rotatably connected in contacting relation with the base plate member 144 by a conventional bearing means 154, as best shown in FIGS. 9 and 10. The bearing means 154 allows the supporting plate 152 to rotate about an axis perpendicular to the base plate member 144, this axis being essentially horizontal and longitudinal of the vehicle 20. To aid in maintaining the supporting member 152 in contact with the base plate member 144, a plurality of roller member assemblies 156 are operatively positioned in contact with the supporting wall member 156 at points thereon on the surface opposite of the surface which contacts the base wall member 144, as is best shown in FIG. 9. For positioning each roller member assembly 156, a slot 158 is formed in the supporting wall member 152, and a projection member 160 is securely attached to the base wall member 144 of the implement socket to extend through the slot 158 and appropriately position the roller member assembly 156, as can be seen in FIGS. 8 and 9. Each roller member assembly 156 includes a conventional wheel and axle arrangement, and the projection member 160 positions and retains each assembly 156. The roller member assemblies 156 cooperate with the bearing means 154 in maintaining the supporting wall member 152 in position for contacting the base wall member 144. The supporting wall member 152 presents a large area for contacting the area of the base wall member 144 and applying force thereto in much the same manner as the base wall member 144 applies force to the end member 56 of the frame module. Accordingly, the roller member assemblies 156 and the bearing means 154 do not apply or withstand substantial force during use, since the force is applied substantially over the large area of contact of the supporting wall member 152 on the base wall member 144.

To rotate the supporting wall member 156 about the axis of the bearing means 154, a pair of hydraulic cylinders assemblies 162 are operatively connected between the supporting wall member 152 and the base wall member 144. One end of each of the hydraulic cylinder assemblies 162 is pivotally connected to the supporting wall member at position 164. The other end of the hydraulic cylinder assembly 162 is connected at point 166 to the projection members 160A. The projection members 160A are rigidly attached to the base plate member 144 in the manner previously described. By this arrangement, the simultaneous controlled extension of one hydraulic cylinder assembly 162 and retraction of the other hydraulic cylinder assembly 162 selectively rotates or tilts the supporting wall member. Thus, the movement of the supporting wall member is a rotational movement about an axis generally extending longitudinally and horizontally from the vehicle 20. As will become more apparent, the implement 38 is operatively connected to the supporting wall member 152 and accordingly, the implement 38 tilts or rotates in conjunction with the supporting wall member 52.

The linkage arrangement for operatively attaching the implement 38 to the supporting wall member 152 includes an upper linkage assembly 168 and a lower linkage assembly 170, as best seen in FIGS. 7 and 1. The upper linkage assembly 168 includess two transversely spaced, forward extending, and parallel spaced hydraulic cylinder assemblies 168A and 168B. One end of each hydraulic cylinder assembly 168A and 168B is pivotally connected from the supporting wall member 152 at point 172 and the other end is pivotably connected at point 174 to the implement 38. Both hydraulic cylinder assemblies 168A pivot about transverse parallel axes at points 172 and 174. The lower linkage assembly 170 preferably utilizes a single rigid linkage plate member 176 having a hinged connection at point 178 transversely along a lower portion of the supporting wall member 152. A hinged connection at point 180 connects the longitudinal forward edge of the linkage frame member 176 to the implement 38. The hinged connections at points 178 and 180 allow the linkage plate member 176 to hinge about transverse axes parallel to and below the axes provided by the pivotable connections at points 172 and 174.

The connection points 172, 174, 178, and 180 are positioned to provide the upper and lower linkage assemblies 168 and 170 in essentially parallel and vertically spaced apart relationship. Thus, the upper and lower linkage assemblies function effectively as parallel linkage arms. This parallel linkage arrangement is operative to maintain a selected angle of application of the implement 38 to the earth with changes in relative height or elevation of the frame end 34 with respect to the implement 38. Such changes in height would occur, for example, in grading or smoothing rough or uneven terrain, and in such situations it is desirable that the implement 38 maintains a select angle of contact with the earth at all times. Typically, the implement 38 includes a cutting blade edge 182 (FIG. 7) which angles acutely with the earth for cutting and earth material during forward motion. It is desirable in many situations that the cutting edge 182 maintain a fixed angle of application with the earth it is cutting, and the parallel linkage arrangement of the upper and lower linkage assemblies 168 and 170 secure this desired effect.

To selectively change the angle of application of the implement 38 to the earth material, for example the angle of the cutting edge 182 to the earth, the extended longitudinal length of at least one of the upper or lower linkage assemblies 168 or 170 is selectively varied. By utilizing the hydraulic cylinder assemblies 168A and 168B the length of the upper linkage assembly 168 can be readily changed by adjusting the extended hydraulic cylinder assembly length. It should therefore be appreciated that the upper and lower linkage assemblies function to both selectively adjust the angle of application of the implement to the earth material and to maintain the selected angle of application with relative changes in height between the frame end 34 and the implement 38 during use.

To selectively raise and lower the implement 38 with respect to frame end 34, a pair of hydraulic cylinder assemblies 184 are provided, as best shown in FIGS. 7, 8, and 10. Vertically extending arm structure 186 is attached to the supporting wall 152 and provides a pivotable connection at 188 for the upper end of the cylinder assemblies 184. The other end of the hydraulic cylinder 184 is connected at a pivotable connection point 190 to the linkage plate member 176 of the lower linkage assembly 170. By extending and retracting the plunger of the hydraulic cylinder assemblies 184, the implement 38 can be lowered or raised respectively.

One type of implement 38 which has proved particularly advantageous for use with the traction vehicle 20 and attaching apparatus 36 is an earthmoving blade implement having blade structure 192 defining a U-shape or bowl shape in a horizontal plane opening away from the end of the vehicle. The blade structure 192 includes a transversely extending pushing segment 194 to which the upper and lower linkage members 168 and 170 are operatively attached. A pair of transversely spaced wing members 196 and 198 are attached to the pushing segment 194 by a pair of curved corner blade segments 200 and 202. The wing members 196 and 198 project longitudinally forward from the pushing segment 194. The wing members, corner segments, and pushing segments are permanently fixed together as by welding, and the blade structure 192 is sufficiently reinforced to withstand use during extended periods of pushing earth material or the like about. The transversely extending pushing segment 194 and corner segments 200 and 202 are preferably formed with a cutting edge 182 (FIG. 7) for aiding in cutting earth material. The wing members 196 and 198 may also be formed with a cutting edge if desired.

The U-shaped arrangement of the blade structure 192 causes the earth material to be channeled toward the pushing segment 194 and collected there. The wing members 196 and 198 also allow a considerable amount of material to be collected within the U-shaped or bowl-like configuration, thereby allowing maximum use of the relatively high traction force available from the vehicle 20 in pushing or moving the earth material.

The concepts, advantages and details encompassed within the present invention have been described with particularity, and it is apparent that a new and significantly improved apparatus has been provided. It should be understood that, although the present invention has been described with a certain degree of particularity, the present disclosure has been made by way of example and that changes in details of structure may be made without departing from the spirit of the invention.

What is claimed is:
1. A traction vehicle comprising:
(a) a modular frame structure comprising the following elements permanently and rigidly fixed to one another to define a structurally rigid unified frame module for said traction vehicle:
(i) a pair of drive assembly housings, each of said drive assembly housings being generally of box-like construction, said pair of housings extending longitudinally of said frame module and defining opposite transverse sides thereof;
(ii) at least one upper frame plate member transversely connected between said drive assembly housings at upper positions thereon;

(iii) at least one lower frame plate member transversely connected between said drive assembly housings at positions thereon lower than said upper frame plate member;

(iv) a plurality of reinforcing members connected between said drive assembly housings and at least one of said frame plate members, said reinforcing members extending substantially transversely inward from said drive assembly housings at positions intermediate the longitudinal ends of said frame module;

(v) a pair of frame end members, each end member extending substantially transversely of said frame module at longitudinal ends thereof, each end member being attached to the pair of drive assembly housings and to at least one frame plate member;

(vi) a plurality of wall members connected to and extending transversely inwardly from said drive assembly housings, each of said wall members being positioned at longitudinal locations intermediate longitudinal ends of said frame module, each of said wall members further connecting to and extending upwardly with respect to at least one frame plate member; and (vii) at least one container integrally formed within said frame module intermediate said pair of drive assembly housings and intermediate the longitudinal ends of said frame module, said one container being defined in part by at least one drive assembly housing and by at least one plate member and by at least one wall member;

(b) at least two separate power train assemblies, one of said power train assemblies being operatively associated with each drive assembly housing, each of said power train assemblies supplying reversible motive traction power to one lateral side of said vehicle, each power train assembly comprising:

(i) at least two driving wheel members;

(ii) one axle shaft operatively connected for rotating each wheel member, each axle shaft extending transversely through an associated drive assembly housing and positioning the connected driving wheel member laterally outwardly spaced from said drive assembly housing;

(iii) means interconnecting all of said axle shafts within one drive assembly housing for transmitting rotating power simultaneously to all of said axle shafts within the drive assembly housing;

(iv) motive power supply means associated with said interconnecting transmitting means for supplying motive power to rotate said axle shafts;

(c) tower structure operatively connected to extend above said frame module;

(d) an operator's cab positioned on said tower structure above said frame module, said cab including sidewall structure comprising a plurality of upward extending sidewall panels operatively connected together, each of the sidewall panels generally slopes outwardly and upwardly at approximately the same angle with respect to a vertical reference; and (e) a pair of main support bars extending upward from the support tower structure within said cab, each of said support bars extending generally upwardly along the outwardly sloping sidewall panels and transversely across said cab at an upward position therein, said support bars being essentially parallel to one another and extending generally transversely of said frame module within said cab, said pair of main support bars affording structural rollover protection for said cab.

2. A traction vehicle as recited in claim 1 wherein:

each of said main support bars defines a generally hollow interior, and the hollow interior of each support bar is completely filled with compacted granular solid material.

3. A traction vehicle comprising:

(a) a modular frame structure comprising the following elements permanently and rigidly fixed to one another to define a structurally rigid unified frame module for said traction vehicle:

(i) a pair of drive assembly housings, each of said drive assembly housings being generally of box-like construction, said pair of housings extending longitudinally of said frame module and defining opposite transverse sides thereof;

(ii) at least one upper frame plate member transversely connected between said drive assembly housings at upper positions thereon;

(iii) at least one lower frame plate member transversely connected between said drive assembly housings at positions thereon lower than said upper frame plate member;

(iv) a plurality of reinforcing members connected between said drive assembly housings and at least one of said frame plate members, said reinforcing members extending substantially transversely inward from said drive assembly housings at positions intermediate the longitudinal ends of said frame module;

(v) a pair of frame end members, each end member extending substantially transversely of said frame module at longitudinal ends thereof, each end member being attached to the pair of drive assembly housings and to at least one frame plate member;

(vi) a plurality of wall members connected to and extending transversely inwardly from said drive assembly housings, each of said wall members being positioned at longitudinal locations intermediate longitudinal ends of said frame module, each of said wall members further connecting to and extending upwardly with respect to at least one frame plate member; and (vii) at least one container integrally formed within said frame module intermediate said pair of drive assembly housings and intermediate the longitudinal ends of said frame module, said one container being defined in part by at least one drive assembly housing and by at least one plate member and by at least one wall member;

(b) at least two separate power train assemblies, one of said power train assemblies being operatively associated with each drive assembly housing, each of said power train assemblies supplying reversible motive traction power to one lateral side of said vehicle, each power train assembly comprising:

(i) at least two driving wheel members;

(ii) one axle shaft operatively connected for rotating each wheel member, each axle shaft extending transversely through an associated drive assembly housing and positioning the connected driving wheel member laterally outwardly spaced from said drive assembly housing;

(iii) means interconnecting all of said axle shafts within one drive assembly housing for transmitting rotating power simultaneously to all of said axle shafts within the drive assembly housing;

(iv) motive power supply means associated with said interconnecting transmitting means for supplying motive power to rotate said axle shafts; and (c) an operator's cab operatively attached to extend above said frame module, said cab having bottom, top and sidewall structure, said cab further including at least one support bar operatively rigidly attached to said frame module, the support bar extending generally adjacent the opposite transverse sidewalls and adjacent the top of said cab, the support bar further comprising a first segment extending upward from the bottom to an upper point adjacent the top structure on one transverse side of the cab, a second segment extending upward from the bottom to an upper point adjacent the top structure on the opposite transverse side of said cab from the first segment, and a third segment generally extending transversely between the upper points of the first and second segments.

4. A traction vehicle as recited in claim 3 wherein: the first and second segments of each support bar uniformly slopes horizontally outward of said cab with respect to the position of the first and second segments at the bottom of said cab.

5. A traction vehicle as recited in claim 4 wherein: each support bar includes a generally hollow interior portion, and the hollow interior portion is completely filled with compacted granular solid material.

6. A power train drive assembly for a traction vehicle of the type having a plurality of drive wheel members positioned on axle shaft assemblies extending transversely on opposite sides of a generally elongated rectangular boxlike frame structure, said power train drive assembly comprising chain and sprocket assemblies interconnecting all of said axle shaft assemblies on one transverse side of said frame structure for simultaneous rotation, a main power delivery shaft operatively connected by said chain and sprocket assemblies to deliver power to the axle shaft assemblies on each side of the frame structure, a separate power supply engine means for supplying power to each of said main power delivery shafts to thereby separably rotate said axle shaft assemblies on each side of frame structure, and an improved means for delivering power from said main power delivery shaft to groups of axle shaft assemblies on each lateral side of said traction vehicle, said improved means comprising:

the axle shaft assemblies on each side of said frame structure being divided into a front group of at least two axle shaft assemblies and a rear group of at least two axle shaft assemblies, the front and rear groups including the same number of axle shaft assemblies, pairs of axle shaft assemblies within each group being connected by separate chain and sprocket assemblies;

the main power delivery shaft is longitudinally positioned intermediate the front and rear groups, one sprocket and chain assembly extends from the power delivery shaft to an axle shaft assembly of the front group, and another separate sprocket and chain assembly extends from the power delivery to an axle shaft assembly of the rear group.

7. An improved power delivery means as defined in claim 6 wherein:

each main power delivery shaft includes first and second sprockets next adjacently positioned thereon, the first and second sprockets being respectively connected by separate chains to said front and rear groups of axle shaft assemblies respectively, each power delivery shaft also includes a third sprocket positioned thereon adjacent only one of either the first or second sprockets, and a chain operatively connects the third sprocket with said power supply engine means to transmit power to each main power delivery shaft.

* * * * *